United States Patent [19]

Belforte et al.

[11] Patent Number: 4,545,051
[45] Date of Patent: Oct. 1, 1985

[54] SWITCHING UNIT FOR THE TRANSFER OF DIGITIZED SIGNALS IN PCM SYSTEM

[75] Inventors: Piero Belforte; Bruno Bostica; Luciano Pilati, all of Turin; Amilcare Bovo; Luigi Canato, both of Milan, all of Italy

[73] Assignee: Cselt Centro Studi E Laboratori, Turin, Italy

[21] Appl. No.: 478,467

[22] Filed: Mar. 24, 1983

[30] Foreign Application Priority Data

Mar. 24, 1982 [IT] Italy ................... 67370 A/82

[51] Int. Cl.$^4$ .................... H04Q 11/00; H04J 3/02
[52] U.S. Cl. ......................... 370/66; 370/56; 370/61; 370/63; 370/85
[58] Field of Search ............ 370/66, 62, 61, 63, 370/56, 85

[56] References Cited

U.S. PATENT DOCUMENTS

| | | | |
|---|---|---|---|
| 4,093,827 | 6/1978 | Charansol et al. | 370/66 |
| 4,154,982 | 5/1979 | Charransol et al. | 370/56 |
| 4,386,425 | 5/1983 | Belforte et al. | 370/66 |
| 4,402,078 | 8/1983 | Athenes et al. | 370/66 |
| 4,455,648 | 6/1984 | Binz et al. | 370/66 |
| 4,463,351 | 7/1984 | Chiarottino | 370/85 |

Primary Examiner—Douglas W. Olms
Assistant Examiner—Curtis Kuntz
Attorney, Agent, or Firm—Karl F. Ross; Herbert Dubno

[57] ABSTRACT

A switching unit for the selective transfer of bytes concurrently arriving in successive time slots over eight incoming signal paths to as many outgoing signal paths with intervening temporal and/or spatial transposition comprises a byte memory, loaded by way of a series-/parallel converter and read out by way of a parallel/series converter, under the control of a routing memory dialoguing via a logic network with a microprocessor. The latter, through instructions sent to the logic network, may command the blocking of the readout from the byte memory onto an outgoing path during a given time slot, the insertion of a particular byte into such a time slot, or the transfer of selected bytes from either memory to the microprocessor itself. In particular, bytes from the first time slots of PCM frames arriving over selected signal paths can be so extracted from diagnostic purposes.

6 Claims, 3 Drawing Figures

SWITCHING UNIT FOR THE TRANSFER OF DIGITIZED SIGNALS IN PCM SYSTEM

CROSS-REFERENCE TO RELATED APPLICATION

This application contains subject matter disclosed in commonly owned pending application Ser. No. 262,933 filed May 12, 1981 by three of us, Piero Belforte, Bruno Bostica and Luciano Pilati, now U.S. Pat. No. 4,386,425.

FIELD OF THE INVENTION

Our present invention relates to a switching unit operating in the time-division-multiplexing (TDM) mode for the selective transfer of binary code words such as 8-bit words or bytes, arriving simultaneously during individual time slots of a recurrent frame period over a plurality of incoming signal paths, to a like plurality of outgoing signal paths with intervening temporal and/or spatial transposition.

BACKGROUND OF THE INVENTION

In the usual PCM (pulse-code-modulation) telephone or other telecommunication system, such a frame period may be divided into 32 time slots assigned to respective signal channels including, say, 30 voice channels and two service channels; thus, a group of 32 channels is allotted to each signal path. Each time slot generally has a duration of approximately 4 µs equaling—with 8-bit coding of digitized voice samples—eight bit intervals of 500 ns duration. The temporal and/or spatial transposition enables the transfer of voice samples or supervisory signals from any incoming channel to any outgoing channel, on the same or a different signal path, communicating therewith.

A switching unit or symmetrical time-division matrix (STM) of this type has been disclosed, for example, in U.S. Pat. Nos. 4,093,827 and 4,154,982. As particularly described in the first one of these patents, a series/parallel converter concurrently receives during each time slot the serially arriving bits of respective bytes from eight incoming signal paths or junctions which are then transmitted in parallel, one byte at a time, to a speech memory for temporary storage in respective cells thereof. The readout from the memory, under the control of address instructions from an external source acting as a telephone marker, occurs by way of a serializer receiving the bits of each byte in parallel from the memory and delivering them sequentially, during a designated time slot, to the outgoing signal path or junction for which they are intended.

A switching unit as described in the above-identified application (now U.S. Pat. No. 4,386,425), whose disclosure is hereby incorporated by reference into our present application, comprises a first read/write memory which has cells for the temporary storage of all the code words arriving during one frame period over all incoming signal paths and which is provided with loading means connectable to the incoming paths for inscribing arriving code words in its cells in a predetermined order, under the control of associated timing means, during one or more writing phases of each time slot of a frame period; the memory is further provided with unloading means connectable to the outgoing paths for reading out all (or, possibly, less than all) the inscribed code words in a sequence based on routing information stored in a second read/write memory. A scan of the cells of the latter memory during reading phases also recurring at least once per time slot yields the addresses of the cells of the first memory whose contents are to be consecutively read out to respective outgoing channels by the unloading means during a frame period; this second memory has input means for receiving such routing information in a writing phase as well as output means controlled by the timing means for delivering that information to an address input of the first memory during the reading phases. The routing information remains stored in the second memory until replaced by new information supplied during a writing phase in response to instructions from an associated command unit which are fed to decoding means including circuitry responsive to certain of these instructions for supplementing a stored cell address with an inhibiting or "busy" bit that is transmissible by the output means of the second memory and the address input of the first memory to the corresponding cell of the latter for blocking the transfer of its contents to any outgoing signal path.

In a larger switching array including two or more switching units of this description, whose respective unloading means are connected in parallel (with the aid of OR gates) to the same set of outgoing signal paths, the availability of such an inhibiting bit allows the blocking of the readout from any switching unit during one or more frame periods or during individual time slots thereof whereby these outgoing paths may selectively receive code words from different sets of incoming signal paths respectively terminating at the several units. The readout of an individual switching unit may also be blocked for the duration of a frame period in the event of an interruption of normal operation and initiation of a new microprogram.

OBJECTS OF THE INVENTION

The general object of our present invention is to provide an improved switching unit of the aforedescribed type designed to carry out additional functions, including those that require a two-way exchange of information with an associate/command unit referred to hereinafter as a microprocessor.

A more particular object of our invention is to provide means for supplying the microprocessor with information extracted from either of the two memories for testing and diagnostic purposes.

A related object is to facilitate an exchange of data among different microprocessors by way of cascaded switching units intervening in the establishment of a route for the transmission of digitized voice or other signals between terminals of a PCM telecommunication system.

SUMMARY OF THE INVENTION

A switching unit according to our present invention differs from that of the above-identified prior application and patent primarily by the provision of a logic network in two-way communication with the associated microprocessor and switchover means connected to an output of the first memory for transmitting the contents of a selected cell thereof to the microprocessor in response to a transfer instruction received therefrom.

Pursuant to a more particular feature of our invention, the logic network controls multiplexer means for supplying the first memory with addresses from a time base during writing phases and with addresses from the second memory during reading phases, the multiplexer means being switchable in response to an extraction request from the microprocessor for supplying the first memory during a reading phase with a particular address available at the logic network which designates a certain channel group, assigned to an incoming signal path, for transmitting to the microprocessor the contents of a cell loaded with a byte from the designated group. Preferably, the cell referred to is allotted to the No. 0 channel of that group assigned to the first time slot of a recurrent PCM frame.

Advantageously, for reasons that will become apparent hereinafter, the logic network includes a data extractor which, on the basis of a selection code from the microprocessor and activity information from an input circuit such as a series/parallel converter, generates a particular address of the cell whose contents are to be transmitted to the microprocessor.

In the following description the two memories will again be referred to as a byte memory and a routing memory, respectively, even though the second memory now also serves other purposes. The additional (ninth) bit utilized in that memory, referred to in the prior disclosure as an inhibiting bit, now has a different function and is termed a discriminating bit while the possible blocking of a channel is realized in another manner.

BRIEF DESCRIPTION OF THE DRAWING

The above and other features of our invention will now be described in detail with reference to the accompanying drawing in which.

SPECIFIC DESCRIPTION

Figure 1:
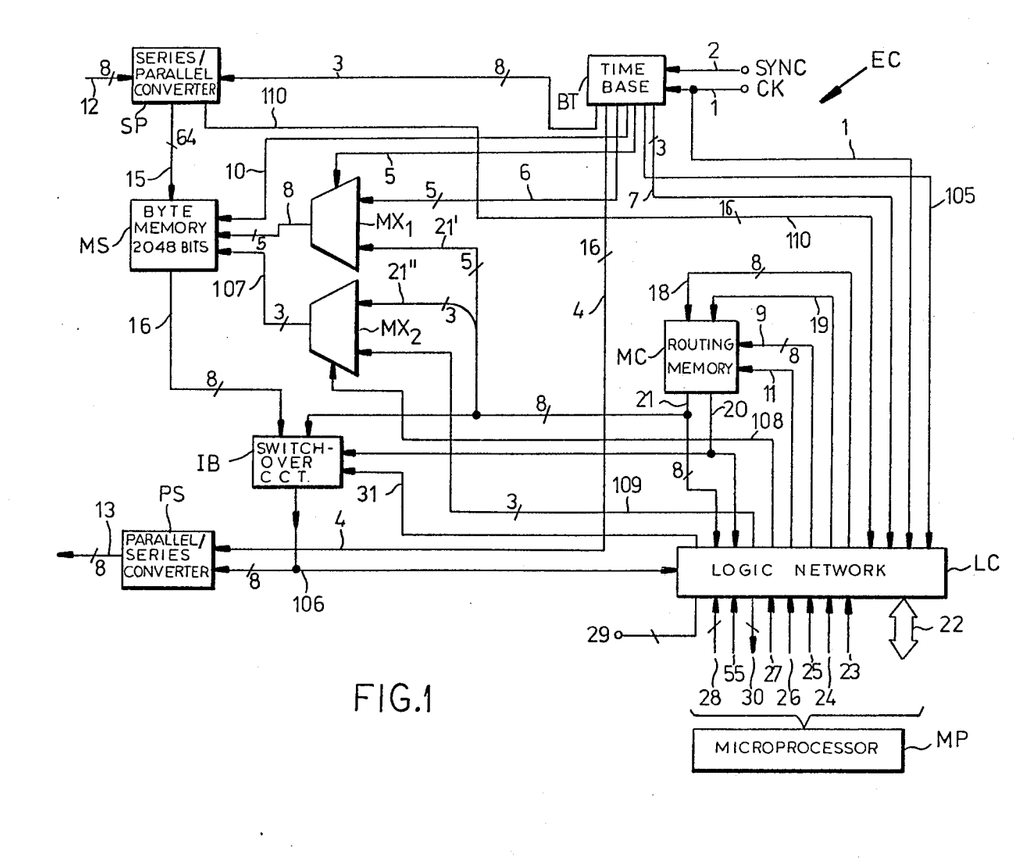
FIG. 1 is a block diagram of a switching unit embodying the present improvement.

In FIG. 1 we have shown a TDM switching unit EC for the selective transfer of voice samples (digitized as bytes) from eight incoming signal paths, collectively designated 12, to eight outgoing signal paths, collectively designated 13. Signal paths 12, each carrying bits from 32 channels assigned to respective time slots of a recurrent frame period, terminate at a series/parallel converter SP from which a 64-lead multiple 15 extends to a loading input of a byte memory MS. An 8-lead wire multiple 16 extends from an unloading output of memory MS to a switchover circuit IB which supplies, via a similar multiple 106, a parallel/series converter PS working into the outgoing signal paths 13. The two converters SP and PS are controlled by stepping and bit-identifying pulses on an 8-lead output multiple 3 and a 16-lead output multiple 4 of a time base BT receiving clock pulses CK at a cadence of 4.096 MHz on a wire 1 and frame-synchronizing pulses SYNC at a cadence of 8 KHz on a wire 2 from a nonillustrated master clock. Circuit IB consists of eight two-input multiplexers.

Time base BT further emits switching pulses, in the form of a square wave with a frequency of 2.048 MHz corresponding to the cadence of the stepping pulses, on a lead 5 to a multiplexer $MX_1$ and on a lead 105 to a logic network LC.

Except for the presence of switchover circuit IB and a second multiplexer $MX_2$, also addressing the memory MS, the switching unit EC shown in present FIG. 1 is generally similar to that of the commonly owned prior application and patent identified above; thus, it also comprises a routing memory MC, but without the associated output memory forming part of the prior disclosure.

Time base BT includes several cascaded binary stages forming a group counter and a channel counter in accordance with the prior disclosure. Thus, a 3-bit code identifying the eight PCM groups on the leads of input multiple 12 and a 5-bit code identifying the 32 channels of each group are sent on the 8-lead multiple 3 to converter SP for a parallel readout of all the bits of up to eight bytes, concurrently present in that converter, via multiple 15 to memory MS. The channel codes are fed by the time base BT to the address inputs of that memory via a 5-lead multiple 6 terminating at one set of inputs of multiplexer $MX_1$ which may forward them to memory MS on a similar multiple 8; this multiplexer is switchable by the time base via a lead 5. The group code, on the other hand, is emitted by time base BT on a 3-lead multiple 7 to logic network LC connected via a similar multiple 109 to multiplexer $MX_2$ whose switching input is energizable by that network via a lead 108; multiplexer $MX_2$ thus has a 3-lead output multiple 107 extending to memory MS. This memory also receives write-enable pulses from time base BT via a lead 10.

A 16-lead multiple 110 extends from series/parallel converter SP to logic network LC for supplying same with the first two bits of each byte appearing in the time slot assigned within each frame of 32 time slots to the No. 0 channel of each group, these bits being used when it is necessary to extract the contents of that channel of any active group as discussed hereinafter.

Memories MS and MC each have 256 cells, each cell accommodating eight bits in the case of memory MS and nine bits—including a discriminating bit—in the case of memory MC. Memory MS thus has a storage capacity of 2,048 bits, operating at a rate of 4 Mbit/sec. Each time slot is divided into one writing phase, enabling the loading of eight out of the 256 cells of memory MS with 64 bits in parallel, and eight reading phases in which the eight bits of eight stored bytes are read out one byte at a time in an order determined by the reading addresses emitted via multiplexers $MX_1$ and $MX_2$. The writing addresses are generated in an invariable sequence on output multiple 6 of time base BT; the designation of each time slot in a frame, and thus of the corresponding channel in a group, ranges from zero through 31 in conformity with the numerical value of the respective 5-bit address code.

The reading addresses, in the form of 5-bit channel codes and 3-bit group codes, will normally be supplied to multiplexers $MX_1$ and $MX_2$ via a 5-lead branch 21' and a 3-lead branch 21'' of an 8-lead output multiple 21 of routing memory MC; this multiple also has extensions terminating at switchover circuit IB and logic network LC. Memory MC has a further output lead 20 extending to logic network LC and to switchover circuit IB. Instruction words of eight bits are supplied by network LC to memory MC via an 8-lead multiple 18 and are accompanied by a discriminating bit on a lead 19. Writing and reading addresses are delivered to that memory by network LC on an 8-lead multiple 9 and include group and channel addresses respectively defined by the three least significant bits and by the five most significant bits of the 8-bit address code. A lead 11 carries write-enable pulses also emitted by network LC.

Acting as an interface between switching unit EC and an associated microprocessor MP, logic network LC communicates with that microprocessor through a bidirectional data bus 22 and a bidirectional control bus including incoming leads 23–26 and an output multiple 30. Another incoming lead 27 and two incoming multiples 28, 29 carry selection signals while a further incoming lead 55 is used, as in the system of the commonly owned prior application and patent, for initiation in response to an external command. Network LC also has an output lead 31 extending to switchover circuit IB for the emission of a command to connect the output multiple 106 of that circuit, normally communicating with the output multiple 16 of byte memory MS, to the output multiple 21 of routing memory MC.

Logic network LC, accordingly, has the tasks of storing outgoing information destined for microprocessor MP, receiving incoming information from the microprocessor and executing operating instructions so received. These operations include the identification of certain PCM groups from which the contents of their No. 0 channels are to be extracted.

Thanks to the two-way connections existing between network LC and microprocessor MP, assembly EC behaves in the manner of a regular peripheral unit of the microprocessor which is assumed to be of the commercially available 8-bit type.

Figure 2:
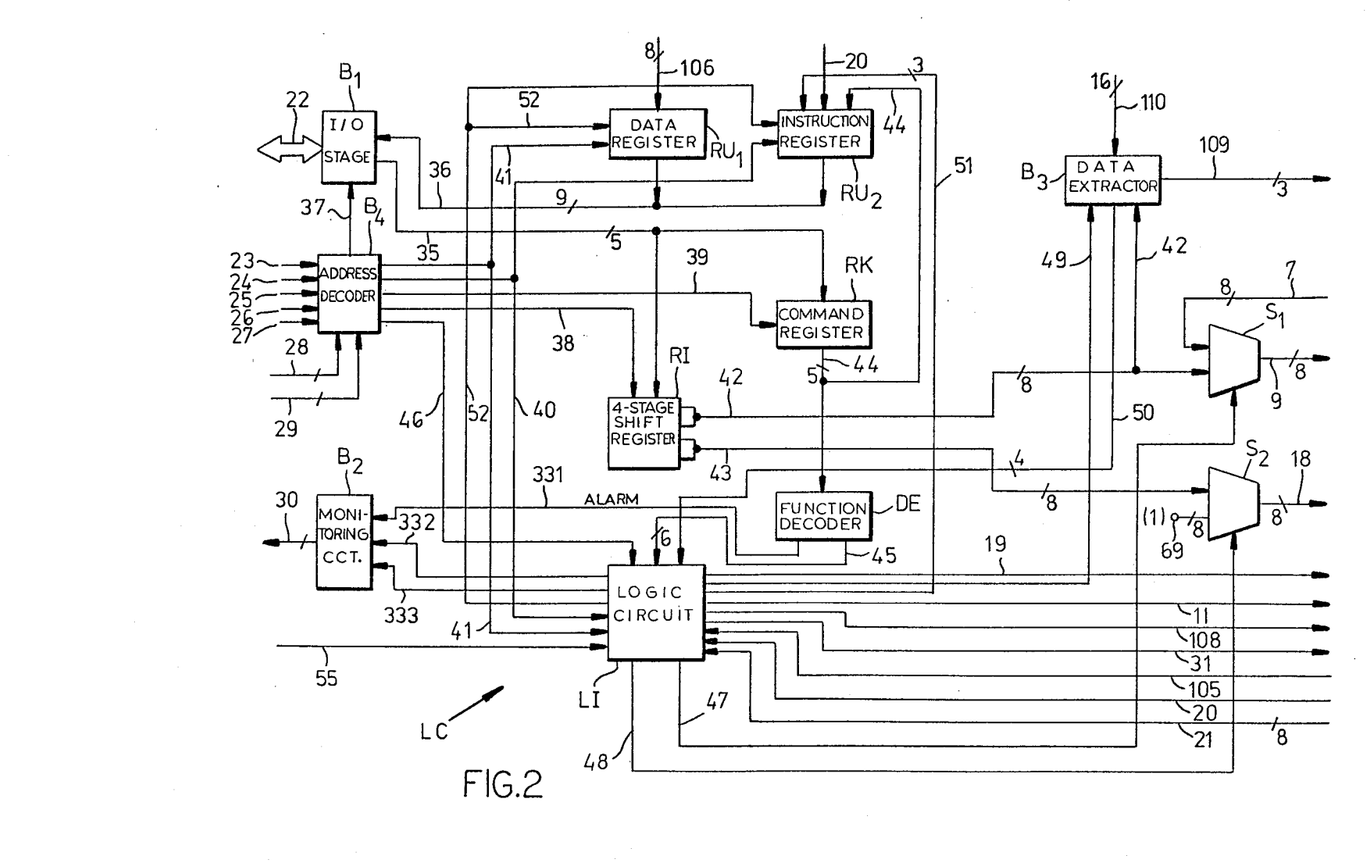
FIG. 2 is a more detailed circuit diagram of a logic network included in the switching unit of FIG. 1.

We shall now refer to FIG. 2 for a more detailed description of logic network LC.

An input/output stage $B_1$ is connected to data bus 22 and is switchable, by a signal on a lead 37 from an address decoder $B_4$, between a 5-lead output multiple 35 and a 9-lead input multiple 36. Multiple 35 works into a 4-stage shift register RI, more fully described below with reference to FIG. 3, as well as into a command register RK loadable in response to a signal on an output lead 39 of decoder $B_4$. A data register $RU_1$ and an instruction register $RU_2$ have outputs connected to multiple 36. Register $RU_1$ has eight inputs tied to respective leads of multiple 106 and is loadable with a byte from switchover circuit IB (FIG. 1) in response to a signal emitted on a lead 52 by a logic circuit LI. A further output lead 41 of decoder $B_4$, also extending to logic circuit LI, enables the unloading of register $RU_1$.

Register $RU_2$, which is also responsive to a loading signal on lead 52, has data inputs connected to a 5-lead output multiple 44 of command register RK and to a 3-lead output multiple 51 of logic circuit LI. The discriminating bit on lead 20 is likewise fed to register $RU_2$. The unloading of this register occurs in response to a signal on yet another output lead 40 of decoder $B_4$ to whose inputs the leads 23–27 and the multiples 28 and 29 are connected; lead 40 further extends to an input of logic circuit LI.

Control signals on leads 23–26 have essentially the same significance as in the prior disclosure. Thus, the voltage level on lead 23 identifies a byte concurrently present on bus 22 as either a data word or an instruction. Leads 24, 25 and 26 respectively carry a transfer command from microprocessor MP, a write-enabling signal indicating the availability of data words or instructions at the microprocessor, and an activating signal for network LC. Lead 27 carries a selection signal whose presence causes a comparator within the decoder to determine whether a binary code generated by the microprocessor on multiple 28 matches a hard-wired code present on multiple 29.

Decoder $B_4$ further sends stepping pulses to shift register RI on a lead 38 and activates logic circuit LI by way of a lead 46, all in response to relevant instructions from the microprocessor.

The output multiple 44 of command register RK has an extension terminating at a function decoder DE which ascertains, by comparison with stored information, whether or not an instruction loaded into register RK is legitimate. If it is not, decoder DE emits an alarm signal on a lead 331 to a monitoring circuit $B_2$ working into output multiple 30. In the presence of a legitimate instruction, decoder DE energizes one of six leads of a multiple 45 extending to logic circuit LI. This logic circuit also has a 4-lead input multiple 50 extending from a data extractor $B_3$ to which the 16-lead multiple 110 feeds the first two bits of eight bytes present in converter SP (FIG. 1) in the first time slot of a frame assigned to channel No. 0. An 8-lead output multiple 42 of shift register RI, connected to the first two stages thereof, extends to data extractor $B_3$ and to a multiplexer $S_1$ whose output connection is the 8-lead multiple 9 referred to in connection with FIG. 1; another set of inputs of this multiplexer is connected to the eight leads of multiple 7. A branch of multiple 42 extends to extractor $B_3$ together with a lead 43 emanating at logic circuit LI; this extractor works into the 3-lead multiple 109 also discussed with reference to FIG. 1. Another multiplexer $S_2$ has one set of inputs connected to an 8-lead multiple 43 originating at the last two stages of shift register RI; a second set of inputs of this latter multiplexer is tied to a multiple 69 whose eight leads are permanently energized with a signal of logical value "1"; multiplexer $S_2$ works into the 8-lead multiple 18 extending to the data inputs of memory MC (FIG. 1). The two multiplexers $S_1$ and $S_2$ are respectively shiftable by signals on output leads 47 and 48 of logic circuit LI to which the externally energizable lead 55 is also connected. An external initiation signal on this lead 55 activates circuit LI and with it the entire logic network LC, causing memory MC (FIG. 1) to be cleared. Circuit LI contains logic gates and flip-flops suitable for carrying out certain operations described hereinafter, including the assignment of relative priorities to requests received from the microprocessor while other operations—such as the extraction of bytes from No. 0 channels of designated groups—are being carried out.

Two further output leads 332 and 333 of logic circuit LI, extending to monitoring circuit $B_2$, are energizable to inform the microprocessor via output multiple 30 that certain operations, specified by the contents of function decoder DE, have been carried out. Circuit LI is also the origin of connections 11, 19, 301 and 108 as well as the destination of connections 20, 21 and 105 shown in FIG. 1.

Figure 3:
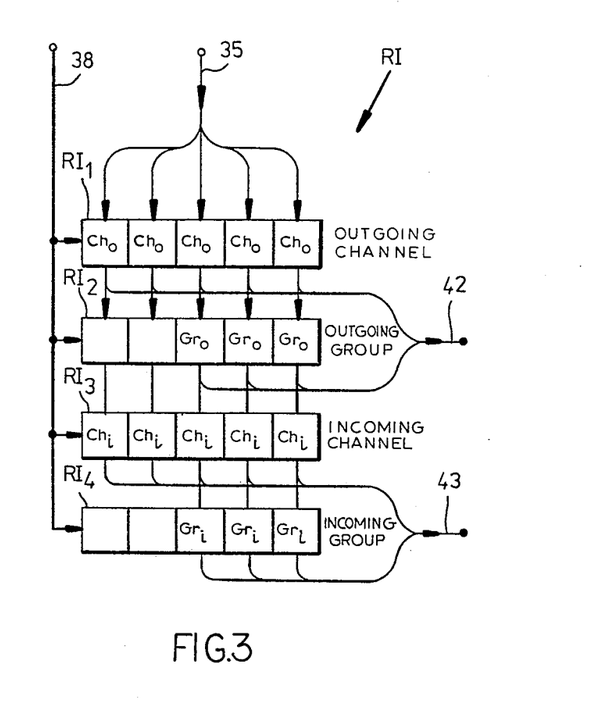
FIG. 3 shows further details of a shift register forming part of the logic network of FIG. 2.

Shift register RI, as shown in FIG. 3, comprises four cascaded stages $RI_1$–$RI_4$ of five single-bit cells each. The cells of the first stage $RI_1$ accommodate five bits $CH_o$ giving the address of an outgoing channel within a group identified by an address of three bits $Gr_o$ concurrently stored in respective cells of stage $RI_2$; these eight bits jointly appear on respective leads of multiple 42 and can be stored in an 8-stage internal register (not shown) of data extractor $B_3$, FIG. 2, upon energization of lead 49. Stages $RI_3$ and $RI_4$ similarly accommodate five bits $CH_i$ and three bits $Gr_i$ jointly present on respective leads of wire multiple 43. The transfer of bits from one stage to the next occurs in response to stepping pulses on lead 38.

In the following description of specific operations of switching unit EC it is to be noted that, as far as routing memory MC is concerned, each time slot clocked by time base BT is divided into 16 phases each equaling half a bit interval. Eight of these phases are invariably used for reading and serve to supply routing information to the address inputs of memory MS while the latter is being read. The eight remaining phases can be used either for reading or for writing, under the control of logic network LC. The leads of wire multiple 4, emanating from time base BT, prevent the loading of the registers of parallel/series converter 13 during these latter phases with the bits then appearing on the leads of multiple 106. Circuitry for establishing alternate writing and reading phases in each bit interval is disclosed in the commonly owned prior application and patent.

The detection of a matching code within circuit B$_4$, by a comparator connected to multiples 28 and 29, will be required mainly when the unit EC here considered is part of a larger array such as, for example, a grouping of three or four units as likewise taught in the prior application and patent. The detection of a match is reported to logic circuit LI on lead 46.

When a writing operation is to be carried out, as indicated by the concurrent energization of leads 25, 26 and 27, circuit B$_4$ energizes lead 38 to load the shift register RI with data words of up to five effective bits received via multiple 35. If lead 23 is also active, lead 39 is energized in lieu of lead 38 to enter a command word in register RK.

If a reading request is signaled by the concurrent energization of leads 24, 26 and 27, logic circuit LI responds to the energization of lead 40 or 41, depending on whether or not lead 23 also carries a signal of logical value "1", by energizing the lead 52 so as to read out the contents of register RU$_2$ or RU$_1$ onto multiple 36 for transfer to the microprocessor via data bus 22.

The command word stored in register RK, defining the operation to be performed, is checked in decoder DE which either instructs logic circuit LI to implement the requested function or generates an alarm signal on lead 331 as noted above. Such a function may require the changeover of multiplexer S$_1$ and/or multiplexer S$_2$ from their normal position, with multiples 9 and 18 respectively joined to multiples 7 and 43, into the off-normal position where multiple 9 receives via multiple 42 a word stored in register RI whereas multiple 18 obtains from multiple 69 the all-1 byte which causes the interruption of an existing link between an incoming and an outgoing signal path via converters SP and PS as well as memory MS. When the command loaded into register RK is an extraction request, asking for a transfer of the contents of a selected cell of memory MS to the microprocessor, logic circuit LI energizes the lead 49 to store the address then appearing on multiple 8 in circuit B$_3$.

Let us now consider specific operations to be performed by unit EC in response to respective commands from microprocessor MP.

I. Linking of incoming and outgoing signal paths

This operation proceeds in a manner essentially conforming to that disclosed in the prior application and patent. A corresponding function code is loaded into register RK and is detected by decoder DE which advises logic circuit LI of its nature. The group and channel addresses respectively identifying an incoming signal path (in multiple 12) and an assigned time slot are sequentially loaded into shift register RI in the form of bits Gr$_i$ and Ch$_i$, followed by bit groups Gr$_o$ and Ch$_o$ respectively designating the outgoing signal path (in multiple 13) and the time slot by which the incoming byte is to be forwarded to its destination. With register RI shifted four times by stepping pulses generated on lead 38, these addresses are loaded into its stages RI$_1$--RI$_4$ in the manner shown in FIG. 3. The eight bits present in stages RI$_1$ and RI$_2$ and the eight bits present in stages RI$_3$ and RI$_4$ are respectively forwarded via multiplexers S$_1$, S$_2$ and multiples 9, 18 to the address and data inputs of memory MC for loading the corresponding cell thereof in a writing phase established by the energization of lead 11. Multiplexer S$_1$ is changed into its alternate position by the energization of lead 47. The discriminating bit concurrently appearing on lead 19, also loaded into the address cell, is "0". The periodic readout of the cell so loaded occurs nondestructively and causes the identification, via multiplexers MX$_1$ and MX$_2$, of a cell of memory MS from which a byte is to be transmitted in a reading phase of the latter memory via circuit IB to converter PS.

The described loading of a cell of memory MC occurs in a read/write phase of that memory during which the converter PS is prevented from storing a byte present on wire multiple 106. In the same read/write phase, after the termination of the writing pulse on lead 11, circuit LI energizes the lead 31 causing the contents of that cell to be read out to register RU$_1$ while the discriminating bit present on lead 20 is loaded into register RU$_2$ together with the operational code available at the output multiple 44 of register RK. The completion of the loading operation is marked by a selective energization of the three leads of multiple 51 with a code designed to inform the microprocessor of that fact. The contents of registers RU$_1$ and RU$_2$ can then be read out to the microprocessor, via multiple 36 and stage B$_1$, in response to appropriate signals fed into decoder B$_4$. From these data, therefore, the microprocessor is able to check on the correct execution of its instruction.

Analogous procedures are followed in the operations described below.

II. Blocking of outgoing channel

When an outgoing channel—represented by an assigned time slot on one of the leads of multiple 13—is to be cut off, e.g. for reasons discussed in the prior application and patent, the address of that channel is entered in the first two stages RI$_1$ and RI$_2$ of register RI. With multiplexers S$_1$ and S$_2$ both switched into their off-normal positions by signals on leads 47 and 48, the former delivers the eight address bits of register stages RI$_1$ and RI$_2$ via multiples 42 and 9 to memory MC while the latter is enabled for writing as in the previous instance. The data word loaded into the addressed cell of memory MC is the all-1 byte present on wire multiple 69, constituting an inhibiting code. Circuit LI also energizes the lead 19 whereby the discriminating bit loaded into that cell also has the logical value "1". The writing in the selected cell is followed, as before, by an entry of the corresponding information in registers RU$_1$ and RU$_2$ for subsequent transfer to the microprocessor, along with the execution code emitted by circuit LI on wire multiple 51.

The presence of discriminating bit "1" on lead 20 causes circuit IB to substitute the inhibiting code for the byte being read out from memory MS on multiple 16, for insertion into the time slot allotted to the outgoing channel, in the bit stream emitted on the corresponding lead of output multiple 13. The choice of high voltage (logical "1") for the blocking of the affected channel avoids the grounding of a transmission path from another switching unit forming a junction with the one involved.

III. Insertion of a byte in memory MC

A byte to be stored in a selected cell of memory MC is loaded into stages $RI_3$ and $RI_4$ of shift register RI for transmission to the data inputs of that memory via multiplexer $S_2$ and multiples 43, 18 while the address of that cell is present, as in the preceding instance, in stages $RI_1$ and $RI_2$ thereof. The writing proceeds again with a changeover of multiplexer $S_1$ into its alternate position; multiplexer $S_2$, however, remains in its normal state. With the discriminating bit on leads 19 and 20 again at its level "1", the byte written in the selected cell of memory MC is again introduced into the bit stream on one of the outgoing leads of multiple 13 in lieu of one emitted on multiple 16 of memory MS.

IV. Transfer of incoming byte to microprocessor

The address of an incoming channel to be tested, from which a byte is to be transmitted to microprocessor MP, is written in stages $RI_1$ and $RI_2$ of shift register RI for identifying a cell of memory MC which contains the address of this incoming channel. In response to the relevant instruction stored in command register RK, and its translation by decoder DE into a signal on wire multiple 45, logic circuit LI switches multiplexer $S_1$ during a reading phase of memory MS but at an instant when converter PS is prevented from accepting a byte then appearing on multiple 106. The presence of a discriminating bit of level "1" on lead 20 then causes that byte to be transferred, via switchover circuit IB, to register $RU_1$.

V. Transfer of byte from memory MC to microprocessor

This operation is similar to that just described, except that lead 31 is now energized to cause the contents of the selected cell of memory MC to be transferred via multiple 21 and switchover circuit IB to multiple 106 and thus to data register $RU_1$. Circuit LI, on the basis of the nine bits received by it via lead 20 and multiple 21, determines whether these bits differ from the all-1 configuration of the inhibiting code and, in that case, reports the extraction of a valid byte to the microprocessor by energizing its output lead 332.

VI. Scanning of No. 0 channels

This operation is carried out in two different phases. In the first phase, the microprocessor loads stages $RI_1$ and $RI_2$ of shift register RI with eight bits which in the present instance, pursuant to an instruction stored in register RK, signify by logical value which of the eight channel groups arriving over the leads of input multiple 12 are to be tested by the extraction of the contents of their No. 0 channels. These preselected groups are identified by a bit of logical value "1" in the word transmitted via multiple 42 to the internal register of data extractor $B_3$ enabled by a signal on lead 49.

Extractor $B_3$ also receives, via wire multiple 110, the eight pairs of first and second bits of all No. 0 channels in the first time slot of a PCM frame. It is assumed that an idle channel group is denoted by logical values "0", "1" in the first and second bit positions, respectively. When extractor $B_3$ determines from this information that one or more groups designated by the masking byte on multiple 42 are active, it reports both the presence of at least one active group and the number of such groups on multiple 50 to logic circuit LI which causes that number to be stored, together with the instruction word from register RK, in register $RU_2$.

In the second phase, extractor $B_3$ ascertains, from the respective bit positions in its internal register, which of the active and preselected groups has the highest numerical rank; the 3-bit address of the group so designated is emitted on multiple 109 to multiplexer $MX_2$ which is switched by a signal on a lead 108 into its alternate position to address that group when the 64 bits present in the first time slot of a PCM frame appear on wire multiple 15. The existence of an active and preselected group is reported to the microprocessor via lead 333, circuit $B_2$ and multiple 30. The byte extracted from the designated group is entered, in the aforedescribed manner, in register $RU_1$ and is thence forwarded to the microprocessor. The same procedure is repeated as long as preselected and active groups are still present.

It should be noted that the second phase of this scanning operation can be executed concurrently with other functions commanded by the microprocessor. Logic circuit LI establishes an order of priority for such procedures.

The described switching unit, like the one of the prior application and patent, can be readily embodied in integrated circuitry.

We claim:

1. A switching unit for the selective transfer of multibit data words from a plurality of incoming signal paths, arriving simultaneously during individual time slots of a recurrent frame period assigned to respective communication channels to a like plurality of outgoing signal paths under the control of instructions from an associated command unit, comprising:

first memory means having cells for the temporary storage of all the data words arriving during one frame period over all said incoming signal paths;

timing means for controlling the loading of said cells in a predetermined order with arriving data words during each frame period in a writing phase of each time slot;

second memory means with cells for the storage of routing information identifying the cells of said first memory means whose contents are to be consecutively read out to respective outgoing signal paths during a frame period in a plurality of reading phases of each time slot;

logic means in two-way communication with said command unit for receiving said routing information therefrom and supplying same to said second memory means;

switchover means connected to an output of said first memory means and controlled by said logic means for transmitting the contents of a selected cell of said first memory means to said command unit in response to a transfer instruction received therefrom; and multiplexer means controlled by said logic means for supplying said first memory with addresses from said timing means during writing phases and with addresses from said second memory means during reading phases, said multiplexer means being switchable under the control of said logic means in response to an extraction request from said command unit for supplying said first memory means during a reading phase with a particular address available at said logic means designating one of a plurality of channel groups, respectively assigned to said incoming signal paths, for transmission to said command unit of the contents of a cell loaded with a byte from the designated channel group.

2. A switching unit as defined in claim 1 wherein said switchover means is further connected to an output of said second memory means for transmitting the contents of a selected cell thereof to said command unit in response to a different transfer instruction received therefrom.

3. A switching unit for the selective transfer of multibit data words from a plurality of incoming signal paths, arriving simultaneously during individual time slots of a recurrent frame period assigned to respective communication channels to a like plurality of outgoing signal paths under the control of instructions from an associated command unit, comprising:

first memory means having cells for the temporary storage of all the data words arriving during one frame period over all said incoming signal paths;

timing means for controlling the loading of said cells in a predetermined order with arriving data words during each frame period in a writing phase of each time slot;

second memory means with cells for the storage of routing information identifying the cells of said first memory means whose contents are to be consecutively read out to respective outgoing signal paths during a frame period in a plurality of reading phases of each time slot;

logic means in two-way communication with said command unit for receiving said routing information therefrom and supplying same to said second memory means; and multiplexer means controlled by said logic means for supplying said first memory means with addresses from said timing means during writing phases and with addresses from said second memory during reading phases, said multiplexer means being switchable under the control of said logic means in response to an extraction request from said command unit for supplying said first memory means during a reading phase with a particular address available at said logic means designating one of a plurality of channel groups, respectively assigned to said incoming signal paths, for loading successively arriving data words in consecutive writing phases into the cells of said first memory means addressed under the control of said timing means, said logic means including extraction means for generating said particular address in response to a selection code from said command unit and activity information from said input means.

4. A switching unit as defined in claim 3 wherein said input means comprises a series/parallel converter concurrently emitting the bits of all simultaneously arriving data words in the writing phase of each time slot to said first memory means, said activation information being a combination of certain bits of a data word in a predetermined channel of the designated group.

5. A switching unit as defined in claim 4 wherein said selection code contains a variable number of bits identifying respective channel groups to be designated, said extraction means being operable to establish an order of priority among several groups so identified and characterized by an activity-indicating bit combination for sequentially designating the groups from which bytes are to be transmitted to said command unit in successive frame periods.

6. A switching unit for the selective transfer of multibit data words from a plurality of incoming signal paths, arriving simultaneously during individual time slots of a recurrent frame period assigned to respective communication channels to a like plurality of outgoing signal paths under the control of instructions from an associated command unit, comprising:

first memory means having cells for the temporary storage of all the data words arriving during one frame period over all said incoming signal paths;

timing means for controlling the loading of said cells in a predetermined order with arriving data words during each frame period in a writing phase of each time slot;

second memory means with cells for the storage of routing information indentifying the cells of said first memory means whose contents are to be consecutively read out to respective outgoing signal paths during a frame period in a plurality of reading phases of each time slot;

logic means including changover means having a normal position for addressing the cells of said second memory means in an order established by said timing means and having a further position for addressing a cell of said second memory means out of order in response to a loading instruction from said command unit; and switchover means connected to an output of said first memory means and controlled by said logic means for transmitting the contents of a selected cell of said first memory means to said command unit in response to a transfer instruction received therefrom, said changeover means being switchable by a blocking instruction from said command unit to load an addressed cell of said second memory means with an inhibiting code, said switchover means being operable to replace the contents of a cell of said first memory means with said inhibiting code during readout of said contents to an outgoing signal path.

* * * * *

UNITED STATES PATENT AND TRADEMARK OFFICE
CERTIFICATE OF CORRECTION

PATENT NO. :   4,545,051

DATED      :   1 October 1985

INVENTOR(S) :  Piero BELFORTE ET AL.

It is certified that error appears in the above-identified patent and that said Letters Patent is hereby corrected as shown below:

In the heading, left column, item [73], please correct the information about the assignee as follows:

-- CSELT Centro Studi e Laboratori Telecomunicazioni S.p.A., Turin, Italy;

and

ITALTEL Societa Italiana Telecomunicazioni S.p.A., Milan, Italy -- .

Signed and Sealed this

Fourth Day of February 1986

[SEAL]

Attest:

DONALD J. QUIGG

Attesting Officer     Commissioner of Patents and Trademarks